(12) United States Patent
Oran

(10) Patent No.: US 8,321,950 B2
(45) Date of Patent: Nov. 27, 2012

(54) DELIVERING SECURE IPTV SERVICES TO PC PLATFORMS

(75) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 739 days.

(21) Appl. No.: 12/407,810

(22) Filed: Mar. 20, 2009

(65) Prior Publication Data

US 2010/0239090 A1 Sep. 23, 2010

(51) Int. Cl.
*H04L 29/06* (2006.01)

(52) U.S. Cl. ............... 726/26; 726/9; 726/30; 380/44; 380/211

(58) Field of Classification Search .................. None
See application file for complete search history.

(56) References Cited

U.S. PATENT DOCUMENTS

| | | | |
|---|---|---|---|
| 2003/0041250 A1* | 2/2003 | Proudler | 713/182 |
| 2006/0143600 A1* | 6/2006 | Cottrell et al. | 717/168 |
| 2008/0120668 A1* | 5/2008 | Yau | 725/110 |
| 2008/0168486 A1* | 7/2008 | Song et al. | 725/28 |
| 2008/0181412 A1 | 7/2008 | Acar et al. | |
| 2009/0132825 A1* | 5/2009 | Mohanty | 713/176 |
| 2009/0252329 A1 | 10/2009 | Casey et al. | |
| 2009/0316892 A1* | 12/2009 | Candelore | 380/210 |

FOREIGN PATENT DOCUMENTS

| | | |
|---|---|---|
| EP | 1830472 A2 | 9/2007 |
| FR | 2908209 A1 | 5/2008 |
| WO | 2007120892 A2 | 10/2007 |
| WO | 2007125223 A2 | 11/2007 |

OTHER PUBLICATIONS

Ashun, P., "IPTV Overview," TV Platforms Group, BBC Future Media & Technology, 2008, Retrieved Jul. 17, 2012, Online: http://www.bbc.co.uk/blogs/pressred/assets/bbc_tvp_what_is_iptv.pdf.*
Coaxial Networks, "IPTV/VOD over DOSIS Network using IRIS CMTS," 2005-2006, Retrieved Jul. 17, 2012, Online: http://www.coaxialnetworks.com/includes/vod-white-paper.pdf.*
The International Search Report and the Written Opinion, PCT/US2010/027091 (16 pages), May 3 2010.

\* cited by examiner

*Primary Examiner* — Jason K. Gee
*Assistant Examiner* — Robert Leung
(74) *Attorney, Agent, or Firm* — Edell, Shapiro & Finnan, LLC

(57) ABSTRACT

To prevent theft of protected content when IPTV services are provided, a conditional access device (CAD) is connected to a personal computer (PC). An application is launched on the PC from the CAD over universal serial bus (USB) interface. The application configures the PC to allow a user to receive secure internet protocol television (IPTV) services. The conditional access device and an IPTV service provider determine user access to the IPTV services via a network by using a trusted computing base (TCB) on the CAD and keys stored on the CAD. The application decrypts and decodes the IPTV services using the processing and storage capability of the PC. The CAD also receives and processes remote control signals received from a remote control interface. The remote control signals are requests or responses from the user interacting with the application. The application displays content requested by the user or indications of responses by the user via a user interface on the PC.

22 Claims, 4 Drawing Sheets

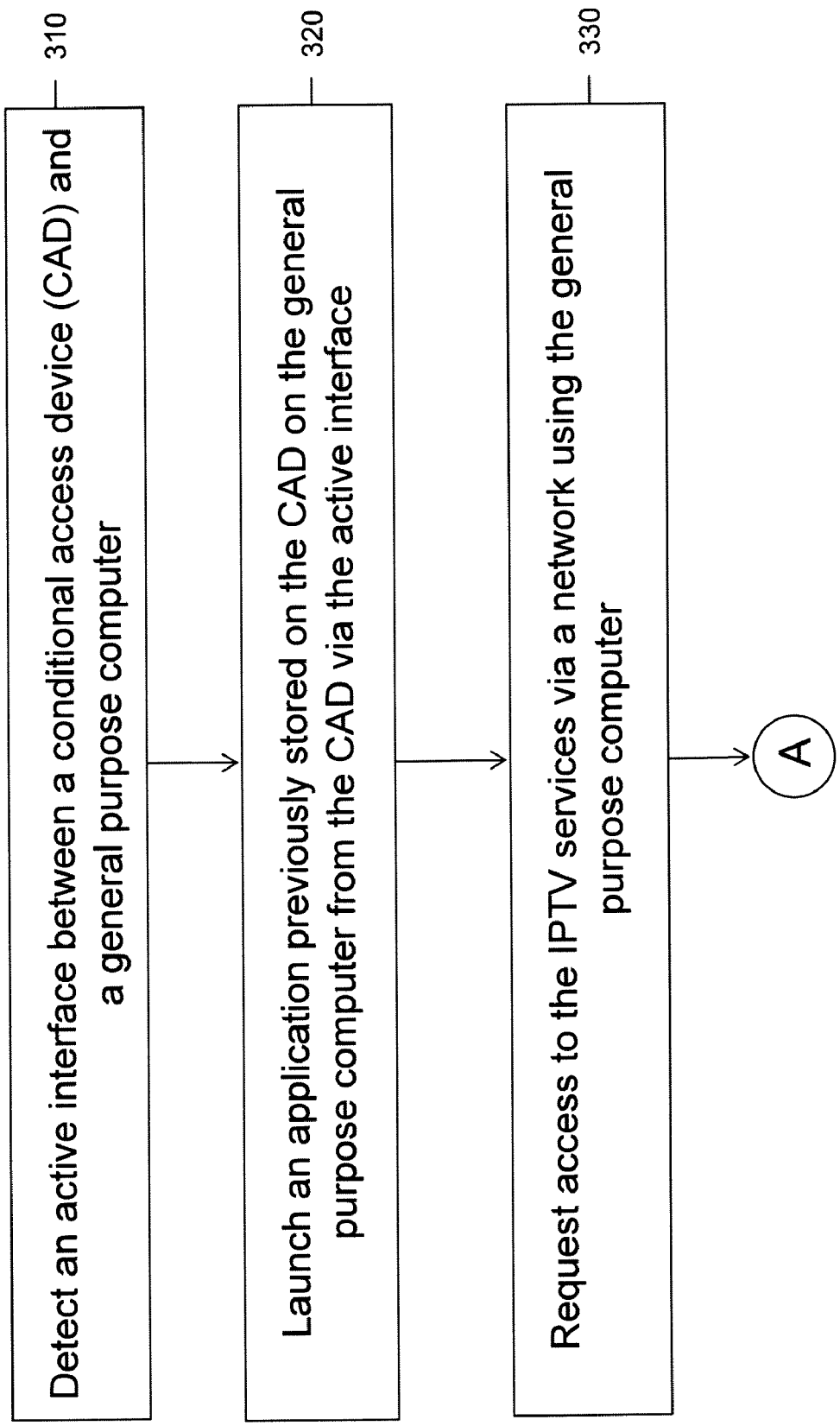

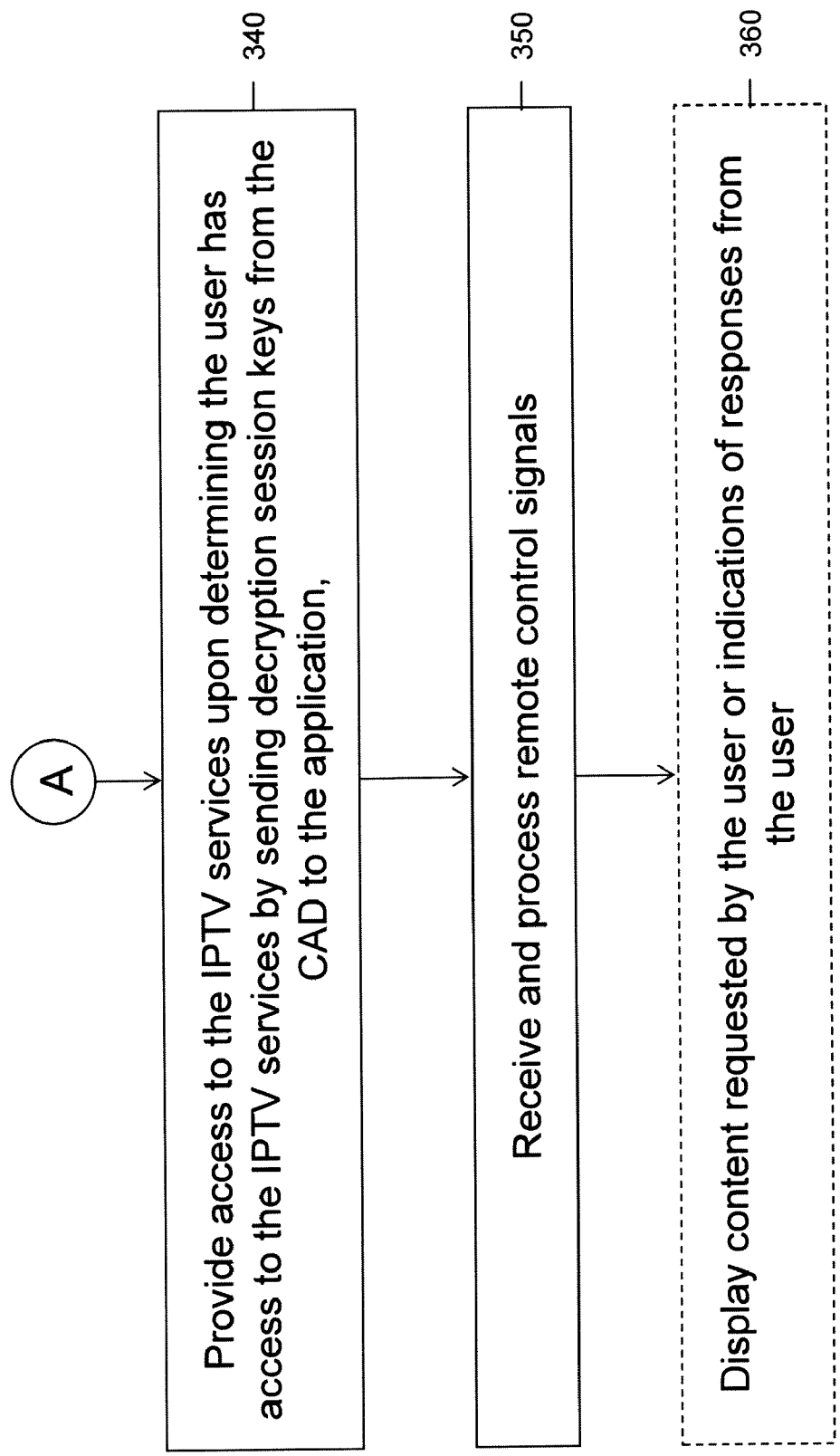

DELIVERING SECURE IPTV SERVICES TO PC PLATFORMS

TECHNICAL FIELD

The present disclosure relates to communications systems and methods, and more specifically to television services delivered over the Internet in a secure environment to, e.g., a personal computer, where the traditional cable television user experience is maintained.

BACKGROUND

Current paid-for television and other broadcast or on-demand services implement content protection schemes to prevent theft. Traditional content protection is achieved through physical security, encryption, digital rights management, and other schemes. At the customer premise dedicated devices such as a set-top-box (STB) or home media servers are used to decrypt and provide content to the end user. Decryption is performed using temporary keys derived by a trusted computing base (TCB) using root keys "burned" into hardware during fabrication and possibly per-subscriber keys loaded into the TCB by the service enrollment process.

However, with the advent of internet protocol television (IPTV), content can be delivered through multiple networks. In addition, content may be delivered from the STB or media server to remote devices such as personal computers or mobile devices. These new content distribution modes open up additional avenues for theft.

BRIEF DESCRIPTION OF THE DRAWINGS

FIGS. 3a and 3b depict a flow chart of the conditional access application process in accordance with an embodiment of the present invention.

DESCRIPTION OF EXAMPLE EMBODIMENTS

Overview

Embodiments of the present invention provide a methodology, and related system components, to detect an active interface between a conditional access device (CAD) and a general purpose computer. An application previously stored on the CAD is launched on the general purpose computer from the CAD via the active interface. The application configures the general purpose computer to allow a user to interact with the application in order to subscribe to internet protocol television (IPTV) services, receive and interact with the IPTV services, decrypt and decode content provided by the IPTV services, display the content to the user, process user requests, present options associated with the IPTV services to a user, and access the IPTV services via a network using the general purpose computer. The conditional access device and an IPTV service provider determine user access to the IPTV services via the network by using a trusted computing base (TCB) on the CAD and using a hierarchy of keys derived from root keys (master keys and key-decryption keys) stored on the CAD, then access to the IPTV services is provided upon determining the user has access to the IPTV services by sending content decryption keys supplied by the TCB from the CAD to the application. The application decrypts and decodes the IPTV services using the processing and storage capability of the general purpose computer. The CAD also receives and processes remote control signals received from a remote control interface. The remote control signals are requests or responses from the user interacting with the application. The application displays content requested by the user or indications of responses by the user via a user interface on the general purpose computer.

Example Embodiments

Figure 1:
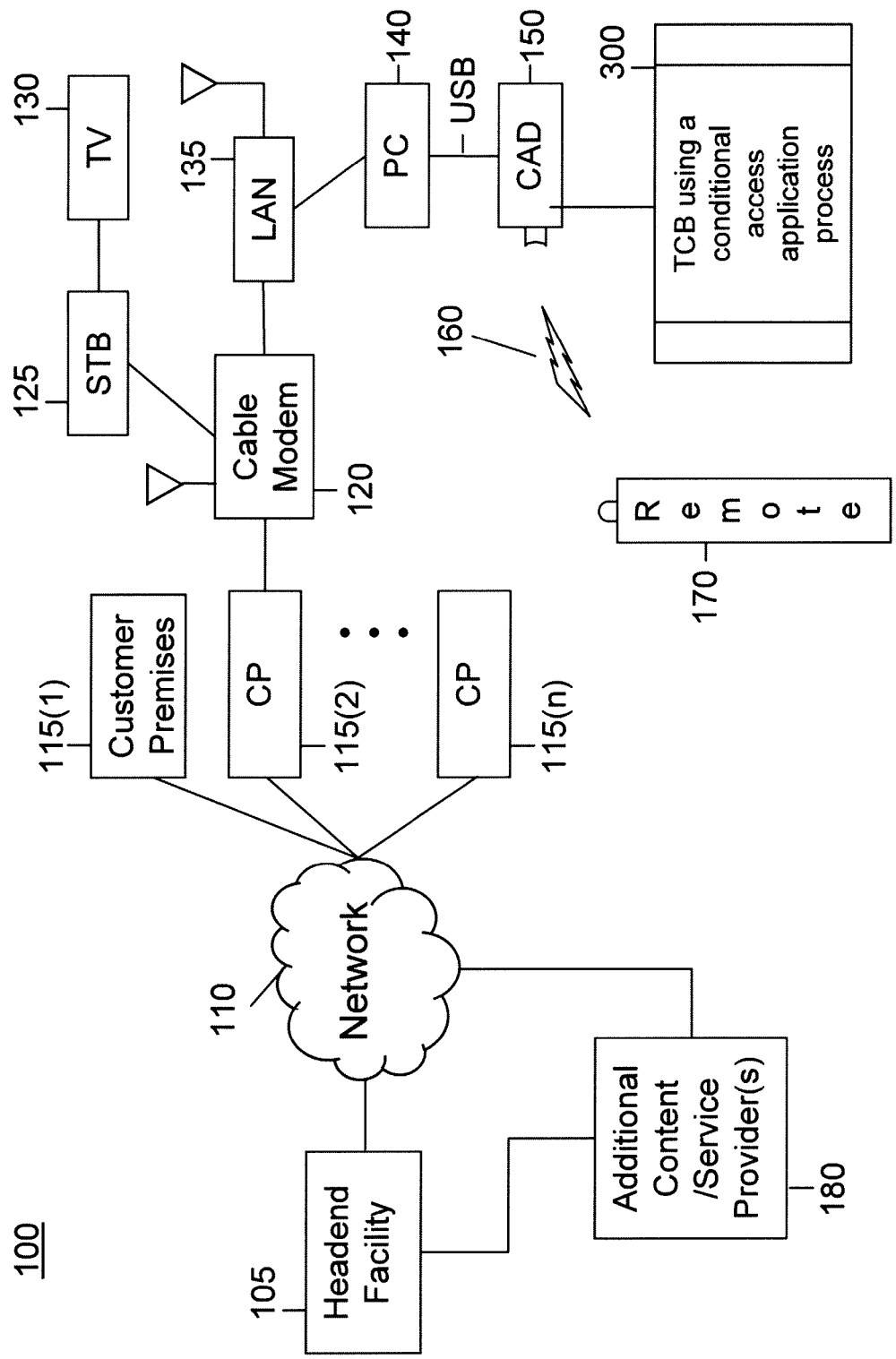
FIG. 1 is an example of a block diagram of an IPTV distribution system in which a headend facility communicates with a general purpose computer coupled to a conditional access device (CAD) utilizing a TCB in accordance with an embodiment of the present invention.

Referring first to FIG. 1, an IPTV distribution system or network is shown generally at reference numeral 100 and comprises a headend facility (HEF) 105, a network 110, a plurality of customer premises (CPs) 115(1)-115(n), a cable modem (CM) 120 residing in CP 115(2), a set-top-box (STB) 125 coupled to a television 130, a local area network (LAN) 135 coupled to a general purpose computer (PC) 140 further coupled to a CAD 150. The CAD 150 comprises non-volatile memory for storing and loading a program into the general purpose computer, a receiver (shown in FIG. 2) for receiving signals 160 from a remote control 170, and a TCB utilizing a conditional access application process 300, hereinafter "the CA process." The cable modem 120, LAN 135, and PC 140 may connect to other wired/wireless data network facilities (not shown) and in that sense serve as a gateway or access point through which additional PCs or consumer devices (not shown) have access to those data network facilities and IPTV services.

Techniques are provided herein whereby a user can connect the CAD 150 to the PC 140 and receive IPTV services from the HEF 105. When the user connects the CAD 150 to the PC 140 the CAD detects an active interface between the PC and the CAD. Upon detection of the active interface the CAD 150 initiates the CA process 300, which is discussed later in conjunction with FIG. 3. Briefly, with the CA process 300, a user plugs the CAD 150 into the PC 140, an application residing on the CAD is launched on the PC 140 and presents an interface to the user in the form of a window or graphical user interface (GUI), whereby the user obtains IPTV services with approximately the same level of security that is provided by a STB (e.g., See American National Standards Institute (ANSI)/Society of Cable Telecommunications Engineers (SCTE) standard 24-10 for IPCablecom security and Federal Information Processing Standards Publication (FIPS PUB) 140-2 Security Requirements for Cryptographic Modules).

It should be understood that the HEF 105 may be a traditional cable industry HEF, some other multiple service operator (MSO) facility, or alternative service provider facility. The HEF 105 authenticates the user's ability to access IPTV services. The HEF 105 also provides IPTV services and content over the network 110, or directs content/services from additional content/service providers 180. Similarly, the network 110 may comprise a dedicated hybrid-fiber coaxial (HFC) network, a public switched telephone network (PSTN), fiber optic network, satellite network, other network, or a combination of the aforementioned networks.

Once IPTV services are available at the CPs, and in particular CP 115(2), they can be distributed throughout the CP 115(2) by the CM 120. The CM 120 can distribute IPTV services to the TV 130 either directly (not shown) or through the STB 125. The CM 120 also distributes IPTV services to the PC 140 either directly (not shown) or through the LAN 140. The distribution may be accomplished using wireline or wireless (not shown) methods. FIG. 1 also depicts a remote control 170 for the user to interact with the application running on the PC 140 via the CAD 150. The remote control 170 may also be the same or similar to a remote control used to communicate with the STB 125. The CAD 150 sends information contained in signals 160 from the remote control 170 though the active interface to the PC 140. The information may be used by the application and/or forwarded to the HEF 105 by using the PC's 140 network communications capability. The HEF 105 may then respond with a response displayed on the PC 140 by the application. The response may also be authenticated by the CAD 150, e.g., if the user requests a video-on-demand (VOD) or other protected content (e.g., pay-per-view or encrypted live content) then the HEF 105 authorizes the content, the CAD 150 provides content decryption keys, and the application decrypts, decodes, and displays the IPTV video.

The examples shown in FIG. 1 are not meant to be limiting. For example, the CM 120 could easily be a digital subscriber line (DSL) modem, Fiber-to-the-home (FTTH), or other form of residential gateway. And although only single instances are shown for the CM 120, STB 125, TV 130, LAN 135, PC 140, and CAD 150, it should be understood that more than one of each device may be present in the CP 115(2).

Figure 2:
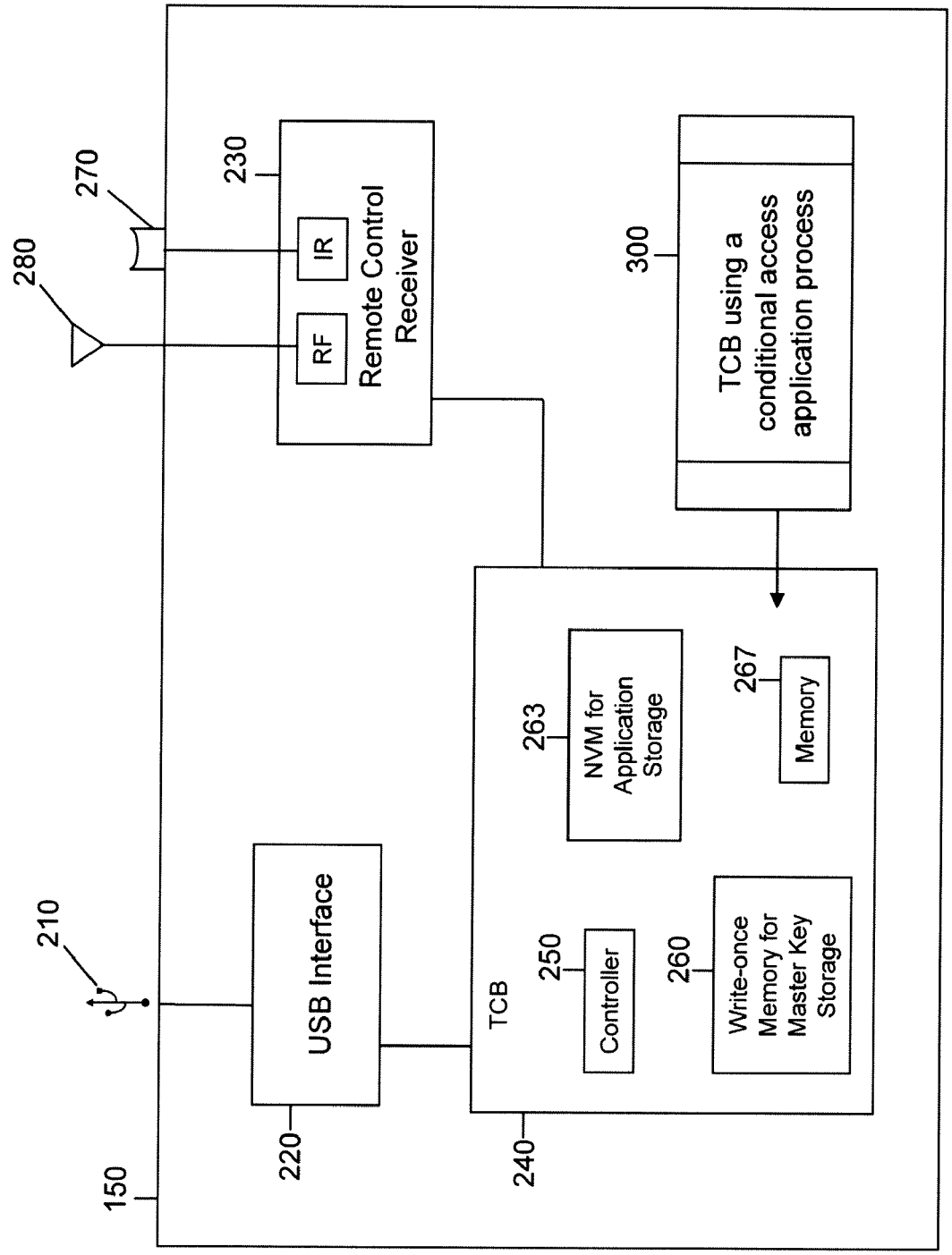
FIG. 2 is an example of a block diagram of a CAD that is configured to perform a conditional access application process that allows a user access to IPTV services in accordance with an embodiment of the present invention.

Turning to FIG. 2, an example of a block diagram is shown of a conditional access device that may serve as the CAD 150. FIG. 2 depicts CAD 150 that is configured to perform the CA process 300 described herein. The CAD 150 comprises a USB connector 210, a USB interface 220, a remote control receiver 230, and a trusted computing base (TCB) 240. The TCB 240 supplies the data to the USB interface 220 to be transmitted and processes signals received by the USB interface. In addition, the TCB 240 processes signals received from the remote control receiver 230. The remote control receiver 230 may comprise a radio-frequency (RF) receiver 280, an infrared receiver (IR) 270, or both. It should be understood that there may be other circuitry, not shown for simplicity, such as analog-to-digital converters (ADCs) and digital-to-analog converters (DACs) in the various signal paths to convert between analog and digital signals.

The CAD 150, as describe herein, comprises the USB interface 220. Although other interfaces may be used, USB is the preferred embodiment. This is due to the ubiquity of USB as an interface on PC-class computers and because the CAD 150 is intended to be a portable device. It could conceivably be as small as a thumb drive or a memory stick that is commonly used with personal computers. The USB interface is capable of supplying power to the CAD 150, thus allowing a reduced size, although the CAD 150 could be powered by batteries or other means. In addition, the USB interface is a plug-and-play interface for which the user merely plugs the CAD 150 into the PC 140 and certain functions can be enabled automatically, such as the automatic launching or terminating of the application that is stored on the CAD 150.

The USB interface 220 may comprise transmitter circuits that supply converted signals to the PC 140 and receiver circuits for receiving signals from the PC 140 to be supplied to the TCB 240. The receiver 230 comprises detection circuitry (not shown) for detecting the signals received at RF receiver 280 and IR receiver 270, and supplies corresponding detected data to the TCB 240.

The TCB 240 comprises a controller 250, a write-once memory 260 or other secure memory for master key storage, a non-volatile memory (NVM) 263 for application storage, or other data storage block 267 that stores data used for the techniques described herein. The TCB 240 may also comprise other hardware, firmware, and/or software essential to attain the desired level of security, and may ultimately form a different configuration than the examples described herein. The memory 267 may be separate or part of the TCB 240, while the write-once memory 260 and the NVM 263 are intended to be within the TCB 240 because they are used for key storage. Instructions for performing the CA process 300 may be stored in the memory 263 for execution by the controller 250. In a preferred embodiment, the memory 263 would store the application and a complete STB or STB-like software suite. By retaining the STB software suite, the service provider's existing STB provisioning and control system can be maintained.

The controller 250 may be an advanced risc machine (ARM), application specific integrated circuit (ASIC), or other processing or controlling device suitable for a TCB. The functions of the controller 250 may be implemented by logic encoded in one or more tangible media (e.g., embedded logic such as an application specific integrated circuit, digital signal processor instructions, software that is executed by a processor, etc.), wherein the memory 263, 267 stores data used for the computations described herein (and/or to store software or processor instructions that are executed to carry out the computations described herein). Thus, the CA process 300 may be implemented with fixed logic or programmable logic (e.g., software/computer instructions executed by a processor). The CA process 300 is described in detail hereinafter in conjunction with FIGS. 3a and 3b.

Briefly, the CA process 300 comprises launching an application on PC 140 from CAD 150 and the application configures the PC 140 for interactive IPTV services. The application, CAD 150, and HEF 105 act in coordination to decrypt, decode, and otherwise process content for interactive presentation to the user.

With reference to FIG. 3a and continued reference to FIGS. 1 and 2, the CA process 300 is now described in greater detail. At 310, an active interface between the CAD 150 and the PC 140 is detected by the CAD 150. In one example, the CAD 150 detects a plug-and play interface such as a USB interface. In other embodiments, the CAD 150 may detect Ethernet, asynchronous transfer mode (ATM), or other interfaces. The TCB 240 protects the service provider from attempts to steal content. The TCB 240 is designed to prevent key theft through physical hardware design to thwart physical tampering of the hardware and to prevent hacking through the active interface (e.g., See FIPS PUB 140-2 noted above).

Next, at 320 an application, previously stored on the CAD, is launched on the PC 140 from the CAD 150 via the USB interface 220 interface. The application configures the PC 140 to allow a user to interact with the application in order to subscribe to IPTV services, receive and interact with the IPTV services, decrypt and decode content provided by the IPTV services, display the content to the user, process user requests, and present options associated with the IPTV services to the user. The application may be launched using an auto run configuration file or similar method. The user may be prompted to confirm the launch. Alternatively, part of the application or application components may be downloaded over the internet, or provided on a CDROM or similar media.

In one embodiment, the user will be prompted by the application to subscribe to the IPTV services. The user may be asked for account information such as, name, address, account number, and the like. The information may be cached for the next launch or periodically confirmed on subsequent launches. In order to receive and interact with the IPTV services the user may be prompted for a password and/or a username. The password may be associated with a specific user account. In one embodiment the user account may also be associated with parental controls. Thus, when the application is launched, and the username and password are entered; viewing restrictions may be implemented, such as duration of access, time of day access, or parental advisory level access, etc. Interaction with the IPTV services may include program browsing, program viewing, interactive gambling with "live" participants, video conferencing, web surfing, and gaming. The password or other credentials entered from or stored on the PC are not used directly to access or subscribe to the IPTV services, but rather to "unlock" the secure credentials stored in the TCB memory on the CAD. These credentials are then used over a secure channel directly between the TCB on the CAD and the HEF in the service provider's network. This prevents theft of the secure credentials by viruses or other malware which may infect the PC.

In another embodiment, the application decrypts and/or decodes IPTV service content. In the case of protected content, such a premium programming, VOD, or pay-per-view (PPV), the content may be encrypted and encoded and placed into a transport stream, such as an MPEG-2 transport stream (TS) or Data Over Cable Service Interface Specification (DOCSIS) compliant stream. The TS may be further encapsulated in IP (TCP/IP). The application decrypts and decodes the content using methods supplied by the vendor or service provider. The application is then able to display the content to the user via an interface on the PC 140. In addition, the application may process user requests and present options associated with the IPTV services to the user. The requests may be authenticated by the CAD 150 or the HEF 105, and the options presented may be provided by the CAD 150 or the HEF 105.

At 330, access to the IPTV services is requested via the network 110 using the PC 140. The CAD 150 and an IPTV service provider, e.g., the HEF 105, determine user access to the IPTV services via the network 110 by using the TCB 240 on the CAD 150, and a hierarchy of keys derived from root keys stored on the CAD 150. The root keys and per-subscriber keys are used along with session keys received from the HEF 105 to derive content keys used for content decryption. This succession of keys forms a key hierarchy for content decryption. Content keys are the keys used to originally encrypt the content. The aforementioned hierarchy of keys consists of all the keys that depend on the root key for the CAD, or on key-decryption keys delivered securely to the CAD. The key hierarchy contains both keys encrypted under other keys, or keys derived from other keys via a local algorithm. The result forms a hierarchy of keys dependent on other keys. The user authentication process is similar to that already used by STBs and is well known in the art.

With reference to FIG. 3b, discussion of the CA process 300 is continued. Next, at 340, once user access is requested and authenticated, access to the IPTV services is provided. Content and other data are streamed from the HEF 105 or additional content providers 180 to the PC 140. The application works with the CAD 150 to obtain the content keys to decrypt portions of content. While this exposes the content keys to possible compromise, the content keys are short lived. The application decrypts and decodes the IPTV services using the processing and storage capability of the PC 140.

At 350, remote control signals are received and processed. The signals are requests or responses from the user interacting with the application. The remote control 170 may provide tradition "channel surfing" capability or enhanced capabilities to interact with new services available with IPTV. In addition, the remote control could be used for digital video recorder (DVR) commands. Although a remote control may be used, it does not preclude a user from using a pointing device, such a mouse, or entering information from a keyboard.

Lastly, at 360, content requested by the user or indications of responses from the user are displayed on the PC 140. Note that 360 is not actually part of the CA process 300 because it occurs on the PC 140 and is so indicated as a dashed box. When the application is launched, it may open in full screen mode where the user is prevented from accessing other applications; the application would control the PC's 140 graphics system. The application provides a display area for the user to view and interact with content. The display area may render a user interface identical to that of the STB 135, so no new user training would be required.

In one embodiment various levels of programming may be provided. For example, most new personal computers can render high-definition (HD) video, but some older models may not be HD capable. The application could detect video capability or allow the user to configure video settings. The same is true for the audio portion. The PC 140 may only be capable of producing stereo, while the actual audio stream may provide various levels of home theater (more than two sound channels) sound. Or video and audio quality may be provisioned just as it is with the STB 125.

In further embodiments, the application or the CAD 150 software may be updated (upgraded) by the CAD 150 over the network 110. The update process may be secured by employing transport security (e.g. TLS—Transport Layer Security), digital signatures on the application code, or both. The application or CAD software may be signed by a signing authority using a signing-key or digital certificate (public-key certificate). The CAD 150 may then authenticate the software update using the keys stored on the CAD or through a chain of trust that includes the trusted signing authority.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   detecting an active interface between a conditional access device (CAD) and a general purpose computer;
   launching an application previously stored on the CAD on the general purpose computer from the CAD via the active interface, wherein the application configures the general purpose computer to allow a user to interact with the application in order to subscribe to internet protocol television (IPTV) services, receive and interact with the IPTV services, decrypt and decode content provided by the IPTV services, display the content to the user, process user requests, and present options associated with the IPTV services to the user;
   requesting access to the IPTV services via a network using the general purpose computer, wherein the conditional access device and an IPTV service provider determine user access to the IPTV services via the network by using a trusted computing base (TCB) on the CAD and using a hierarchy of keys derived from root keys stored on the CAD;

deriving a content decryption key using the hierarchy of keys;

providing access to the IPTV services upon determining the user has access to the IPTV services by sending content decryption keys supplied by the TCB from the CAD to the application, wherein the application decrypts and decodes the IPTV services using the content decryption key, and processing and storage capability of the general purpose computer;

receiving and processing remote control signals at and by the CAD, wherein the signals are requests or responses from the user interacting with the application; and displaying content requested by the user or indications of responses from the user.

2. The method of claim 1, wherein detecting comprises detecting a Universal Serial Bus (USB) interface, wherein the CAD is present on the USB.

3. The method of claim 1, further comprising detecting from the IPTV service provider when a new version of the application is available and securely upgrading the application via the network, wherein securely upgrading comprises upgrading by using a secure communication channel and/or digitally signed application code.

4. The method of claim 1, further comprising detecting from the IPTV service provider when a new version of CAD software is available and securely upgrading the conditional access device software via the network, wherein securely upgrading comprises upgrading by using a secure communication channel and/or digitally signed software media.

5. The method of claim 1, wherein accessing comprises accessing the content using digital rights management (DRM).

6. The method of claim 1, wherein receiving and processing comprises receiving and processing remote control signals comprising subscriber account information, channel change requests, digital video recorder commands, and interactive inputs associated with the IPTV services.

7. The method of claim 1, wherein the application requires a username and/or password, and wherein the username and or password are associated with a level of allowable IPTV content.

8. An apparatus comprising:
a first interface configured to communicate with a general purpose computer;
a processing suite comprising a trusted computing base with non-volatile memory and configured to:
launch an application via the first interface, wherein the application configures the general purpose computer to allow a user to interact with the application in order to subscribe to IPTV services, receive and interact with the IPTV services, decrypt and decode content provided by the IPTV services, display the content to the user, process user requests, and present options associated with the IPTV services to the user;
generate content decryption keys via a key hierarchy;
send the content decryption keys to the application for the application to decrypt the content;
a memory for storing the application, data, and a processing instruction set; and
a second interface configured to communicate with a remote control device, wherein the remote control device allows the user to interact with the application.

9. The apparatus of claim 8, wherein the first interface is a Universal Serial Bus (USB) interface.

10. The apparatus of claim 8, wherein the processing suite further comprises a reduced instruction set processor.

11. The apparatus of claim 8, wherein the processing suite is further configured to securely upgrade the application, wherein the processing suite upgrades the application using a secure communication channel and/or digitally signed application code.

12. The apparatus of claim 8, wherein the processing suite is further configured to securely upgrade the processing instruction set, wherein the processing suite upgrades the application using a secure communication channel and/or a digitally signed processing instruction set.

13. The apparatus of claim 8, wherein the processing suite is further configured to control access to the content using digital rights management (DRM).

14. The apparatus of claim 8, wherein the second interface is one of an infrared interface, a radio frequency interface, and a wireline interface.

15. The apparatus of claim 8, wherein the apparatus is portable.

16. A system comprising:
a general purpose computer coupled to a network and configured to receive an application from a conditional access device and run the application, wherein the application configures the general purpose computer to allow a user to interact with the application in order to subscribe to the IPTV services, receive and interact with the IPTV services, decrypt and decode content provided by the IPTV services, display the content to the user, process user requests, and present options associated with the IPTV services to the user; and
a conditional access device (CAD) coupled to the general purpose computer comprising:
a first interface configured to communicate with the general purpose computer;
a processing suite comprising a trusted computing base with non-volatile memory configured to:
launch the application via the first interface;
generate content decryption keys via a key hierarchy;
send the content decryption keys to the application for the application to decrypt the content;
a memory for storing the application, data, and a processing instruction set; and
a second interface configured to communicate with a remote control device.

17. The system of claim 16, wherein the first interface of the CAD is a Universal Serial Bus (USB) interface.

18. The system of claim 16, wherein the processing suite of the CAD further comprises a reduced instruction set processor.

19. The system of claim 16, wherein the processing suite of the CAD is further configured to securely upgrade the application, wherein the processing suite upgrades the application using a secure communication channel and/or digitally signed application code.

20. The system of claim 16, wherein the processing suite of the CAD is further configured to securely upgrade the processing instruction set, wherein the processing suite upgrades the application using a secure communication channel and/or a digitally signed processing instruction set.

21. The system of claim 16, wherein the processing suite of the CAD is further configured to control access to the content using digital rights management (DRM).

22. The system of claim 16, wherein the second interface of the CAD is one of an infrared interface, a radio frequency interface, and a wireline interface.

* * * * *